United States Patent
Fujita et al.

(10) Patent No.: US 7,281,908 B2
(45) Date of Patent: Oct. 16, 2007

(54) ELECTRICALLY POWERED BLOWER WITH IMPROVED HEAT DISSIPATION

(75) Inventors: Katsutoshi Fujita, Katano (JP); Makoto Ueno, Kadoma (JP); Shigeaki Fujiki, Kadoma (JP); Tetsuo Shimasaki, Nanjyo (JP)

(73) Assignee: Matsushita Electric Indutrial Co., Ltd., Osaka (JP)

( * ) Notice: Subject to any disclaimer, the term of this patent is extended or adjusted under 35 U.S.C. 154(b) by 486 days.

(21) Appl. No.: 10/499,727

(22) PCT Filed: Dec. 9, 2002

(86) PCT No.: PCT/JP02/12880

§ 371 (c)(1),
(2), (4) Date: Jun. 21, 2004

(87) PCT Pub. No.: WO03/054394

PCT Pub. Date: Jul. 3, 2003

(65) Prior Publication Data

US 2005/0079069 A1    Apr. 14, 2005

(30) Foreign Application Priority Data

Dec. 21, 2001   (JP) ............................. 2001-389132

(51) Int. Cl.
*F04B 39/00* (2006.01)
*H02K 5/00* (2006.01)

(52) U.S. Cl. ...................... 417/369; 310/89; 310/68 R; 310/59

(58) Field of Classification Search ................ 417/366, 417/369, 423.14, 423.2; 310/89, 58, 59, 310/68 R
See application file for complete search history.

(56) References Cited

U.S. PATENT DOCUMENTS

| | | | | |
|---|---|---|---|---|
| 5,331,239 A | * | 7/1994 | Kwun et al. | 310/68 R |
| 6,116,864 A | * | 9/2000 | Veser et al. | 417/364 |
| 6,524,082 B2 | * | 2/2003 | Morita et al. | 417/366 |
| 6,599,104 B2 | * | 7/2003 | Saito et al. | 417/366 |
| 6,861,774 B2 | * | 3/2005 | Shimasaki et al. | 310/58 |

FOREIGN PATENT DOCUMENTS

| | | |
|---|---|---|
| EP | 1 138 242 A2 | 10/2001 |
| JP | 64-4897 | 1/1989 |
| JP | 02204699 | 8/1990 |
| JP | 03111700 | 5/1991 |
| JP | 03178619 | 8/1991 |
| JP | 5-70183 | 9/1993 |
| JP | 06038452 | 2/1994 |
| JP | 2002031084 | 1/2002 |
| JP | 2002048099 | 2/2002 |

* cited by examiner

*Primary Examiner*—Anthony Stashick
*Assistant Examiner*—Vikansha Dwivedi
(74) *Attorney, Agent, or Firm*—Steptoe & Johnson LLP

(57) ABSTRACT

An electrically powered blower configured to be capable of fully cooling its motor and of efficiently cooling a power element in a drive circuit without involving such need as of increasing the size of a fin of a separate heat radiator, contributing to miniaturization of electric equipments. The electrically powered blower includes a power element (10) provided in a drive circuit (9) and connected to a motor casing (B). Since the motor casing (B) serves as a cooling fin for the power element (10), a great effect on cooling can be obtained, and a heat radiator separate from the motor casing is not required, thus contributing to miniaturization of electric equipments.

6 Claims, 11 Drawing Sheets

ELECTRICALLY POWERED BLOWER WITH IMPROVED HEAT DISSIPATION

TECHNICAL FIELD

The present invention relates to an electrically powered blower used in electric equipment.

BACKGROUND ART

In recent electric equipment such as vacuum cleaners requiring electrically powered blowers, electric supply to a motor section comprising a stator and a rotor is controlled by a drive circuit in many cases.

In the electrically powered blower used in such equipment, since driving current is increased as blowing ability is increased, a heating value of a power element used in the drive circuit is increased, and a heat radiation plate made of aluminum is mounted on the power element to suppress the temperature rise of the element.

A conventional electrically powered blower has a structure as shown in FIG. 11.

A motor section A has a motor casing B including a pair of brackets 3 and 4. A stator 1 and a rotor 2 are incorporated in the motor casing B. An output shaft 5 rotatably supports the rotor 2, and extends outside of the motor casing B. A rotation fan 6 is mounted on a tip end of the output shaft 5. An air guide 7 is mounted such as to divide the rotation fan 6 from the stator 1 and the rotor 2. A fan case 8 is mounted such as to cover the rotation fan 6 and the air guide 7. The fan case 8 has an opening corresponding to a suction port 12 of the rotation fan 6. An air passage C is formed such that air in a discharge port 13 of the rotation fan 6 is discharged from an inner side of the motor casing B.

A drive circuit 9 controls electric supply to the motor section A. The drive circuit 9 is mounted on a heat radiator 11 which is disposed in the vicinity of the motor casing B. Heat of power elements 10 of the drive circuit 9 is radiated to the heat radiator 11. The heat radiator 11 comes into contact with air flow which is discharged from a discharge port 14 formed in the bracket 4, and is forcibly cooled, so that the temperature rise is suppressed.

More specifically, when the motor section A is a three-phase brushless motor, a plurality of power elements 10 which control the electric supply to the phases are mounted on the heat radiator 11.

In the electric equipment having the above-described electrically powered blower, in order to efficiently cool the drive circuit 9 and the power elements 10, it is common to increase the air amount of the air flow which comes into contact with the heat radiator 11 and passes therethrough, or to increase the size of the fins themselves of the heat radiator 11.

However, if the air amount of the air flow which comes into contact with the heat radiator 11 and passes therethrough is increased, the air amount flowing to the stator 1 and the rotor 2 of the motor section A is reduced, so that the motor section A can not be cooled sufficiently. If the size of the fins themselves of the heat radiator 11 are increased, there is a problem that the size of the electric equipment itself is increased.

DISCLOSURE OF THE INVENTION

The present invention has been accomplished to solve the conventional problem, and it is an object of the invention to provide an electrically powered blower which can sufficiently cool the motor section A and, also, efficiently cool the power elements 10 of the drive circuit 9 and can contribute to miniaturization of electric equipment without increasing the size of the fins of the heat radiator 11.

In order to solve the above problem, an electrically powered blower of the present invention has a feature in that a power element of a drive circuit is mounted on a motor casing to eliminate the need of a heat radiator which is independent from the motor casing.

An electrically powered blower of the present invention has the following features. A stator and a rotor which can rotate and is opposed to the stator are provided inside a motor casing, an output shaft rotatably supports the rotor and extends outward of the motor casing, a rotation fan is mounted on a tip end of the output shaft, a fan case having an opening corresponding to a suction port of the rotation fan is fixed to an outer periphery of the motor casing such as to cover the rotation fan, an air passage discharges air in a discharge port of the rotation fan through an inner side of the motor casing, and power elements of a drive circuit which controls electric supply to the motor section comprising the stator and the rotor are mounted on the motor casing.

The electrically powered blower of the present invention also has the following feature. The power elements of the drive circuit are mounted on an outer peripheral surface of the motor casing from outside.

An electrically powered blower of the present invention has the following features. A stator and a rotor, which can rotate and is opposed to the stator, are provided inside a motor casing, an output shaft rotatably supports the rotor and extends outward of the motor casing, a rotation fan is mounted on a tip end of the output shaft, a fan case having an opening corresponding to a suction port of the rotation fan is fixed to an outer periphery of the motor casing such as to cover the rotation fan, an air passage discharges air in a discharge port of the rotation fan through an inner side of the motor casing, power elements of a drive circuit which controls electric supply to the motor section comprising the stator and the rotor are mounted on an outer peripheral surface of the motor casing from outside, air flow discharged from an air opening formed in the motor casing is allowed to come into contact with the power elements, and the motor casing is formed with a wind direction guide extending around the air opening toward the power elements.

The electrically powered blower of the present invention also has the following features. First and second brackets form the motor casing which covers a motor section comprising the stator and the rotor, and an outer periphery of the fan case is connected to the second bracket, the first bracket is disposed in a space surrounded by the second bracket and the fan case, the drive circuit is incorporated inside the motor casing formed by the first and second brackets, the power element is mounted on the first bracket in a space surrounded by the second bracket and the fan case.

The electrically powered blower of the present invention also has the following feature: currents of a plurality of phases are supplied to the motor section to operate the same, and a pair of top drive power element and bottom drive power element are disposed for each of phases.

The electrically powered blower of the present invention also has the following feature: currents of three phases are supplied to the motor section to operate the same, and pairs each comprising a top drive power element and a bottom drive power element are disposed such as to be spaced from one another through 120° for each phase.

The electrically powered blower of the present invention also has the following feature. Currents of three phases are supplied to the motor section to operate the same, and pairs each comprising a top drive power element and a bottom drive power element are disposed such as to be spaced from one another through 60° for each phase.

BEST MODE FOR CARRYING OUT THE INVENTION

An electrically powered blower of the present invention will be explained below based on embodiments.

Embodiment 1

FIGS. 1 to 7 show Embodiment 1 of the present invention.

Figure 1:
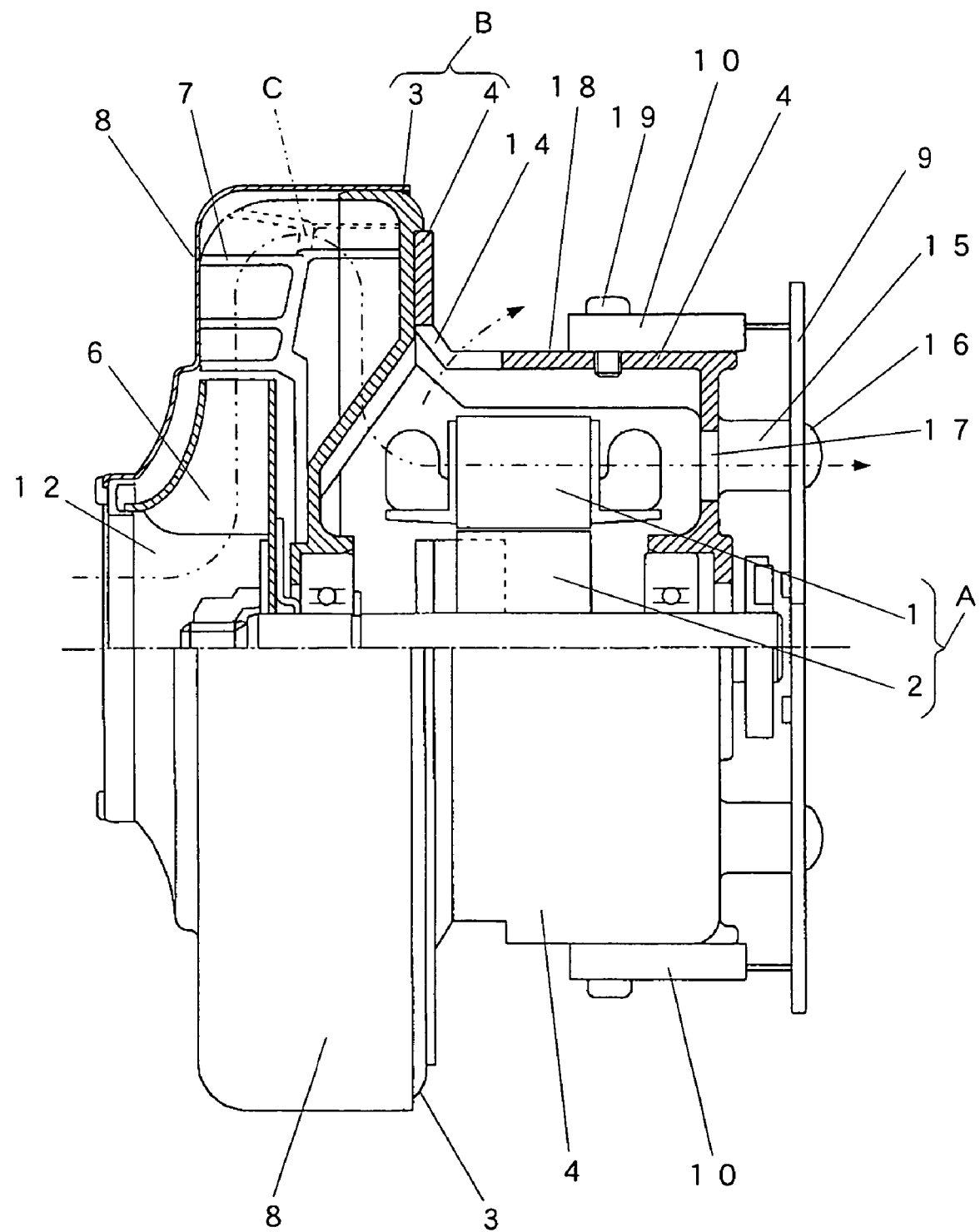
FIG. 1 is a semi-sectional view of an electrically powered blower (Embodiment 1) of the present invention.
Figure 2:
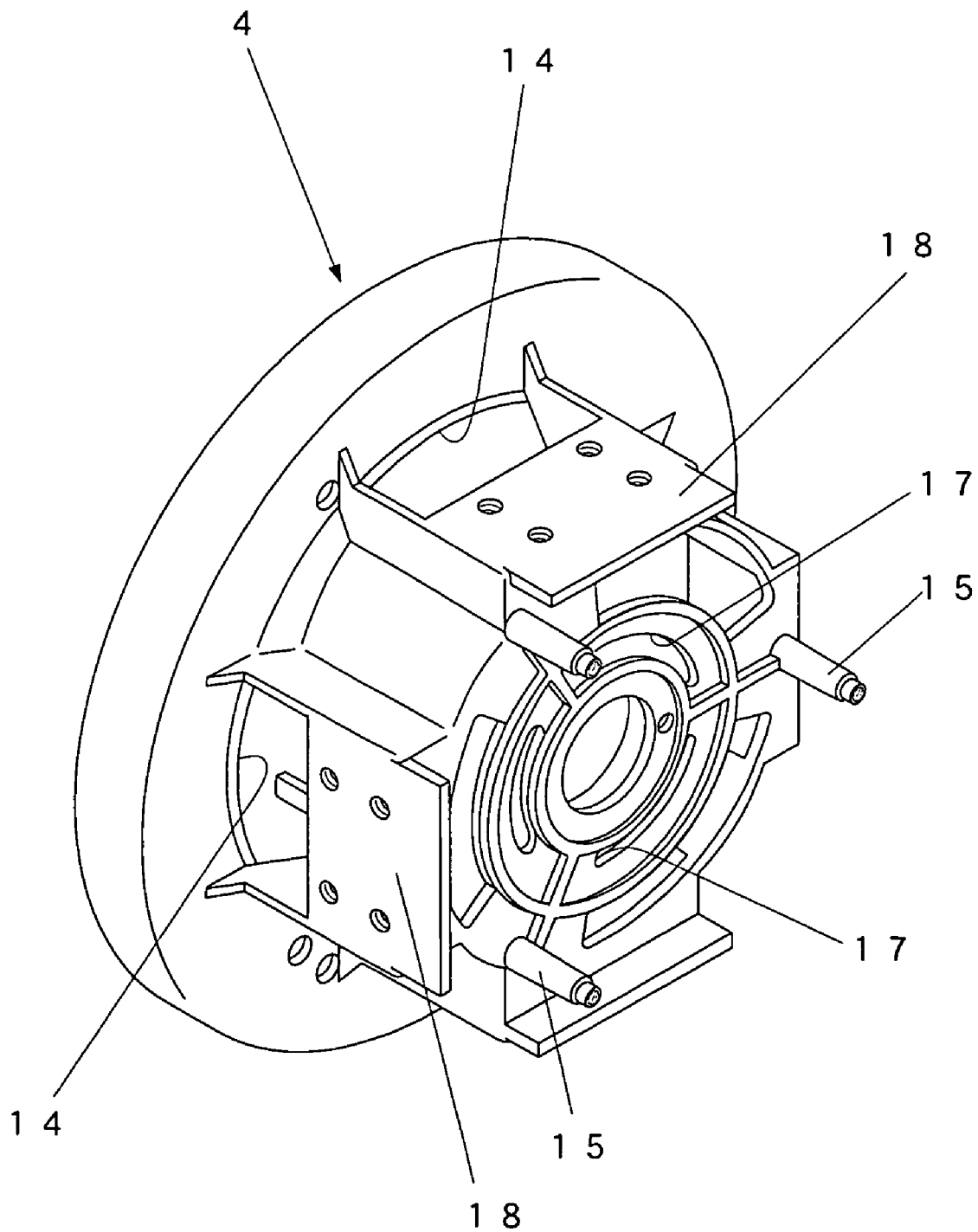
FIG. 2 is a perspective view of a bracket 4 of the embodiment.

FIG. 1 is a semi-sectional view of an electrically powered blower (Embodiment 1). In this electrically powered blower, a pair of brackets (first and second brackets) 3 and 4 are made of aluminum and form a motor casing B. The motor casing B incorporates a stator 1 and a rotor 2 which is disposed in the stator 1 in an opposed relation to the stator 1 and has on one side an output shaft 5 extending longitudinally from the bracket 3. The rotor 2 is rotatably supported by the motor casing B. A rotation fan 6 is mounted on a tip end of the output shaft 5 which extends outward of the motor casing B. An air guide 7 is mounted such as to separate the rotation fan 6 from the stator 1 and the rotor 2. A fan case 8 is fixed to an outer periphery of the bracket 3 such as to cover the rotation fan 6. The fan case 8 has an opening corresponding to a suction port of the rotation fan 6.

A motor section A comprises the stator 1 and the rotor 2 incorporated in the motor casing B. A drive circuit 9 controls the electric supply to the motor section A. The drive circuit 9 is mounted on a boss 15 by means of a screw 16. The boss 15 is formed on an outer end surface of the motor casing B on the opposite side from the rotation fan 6.

If the motor section A is actuated and the rotation fan 6 rotates, air drawn from the suction port 12 of the rotation fan 6 flows inside of the motor casing B through the air guide 7 as shown with an arrow C. A portion of the air is discharged from an air opening 14 (see the perspective view of FIG. 2) formed in the bracket 4. Remaining air cools the stator 1 and the rotor 2, and is discharged from a discharge port 17 formed in the bracket 4.

Figure 3:
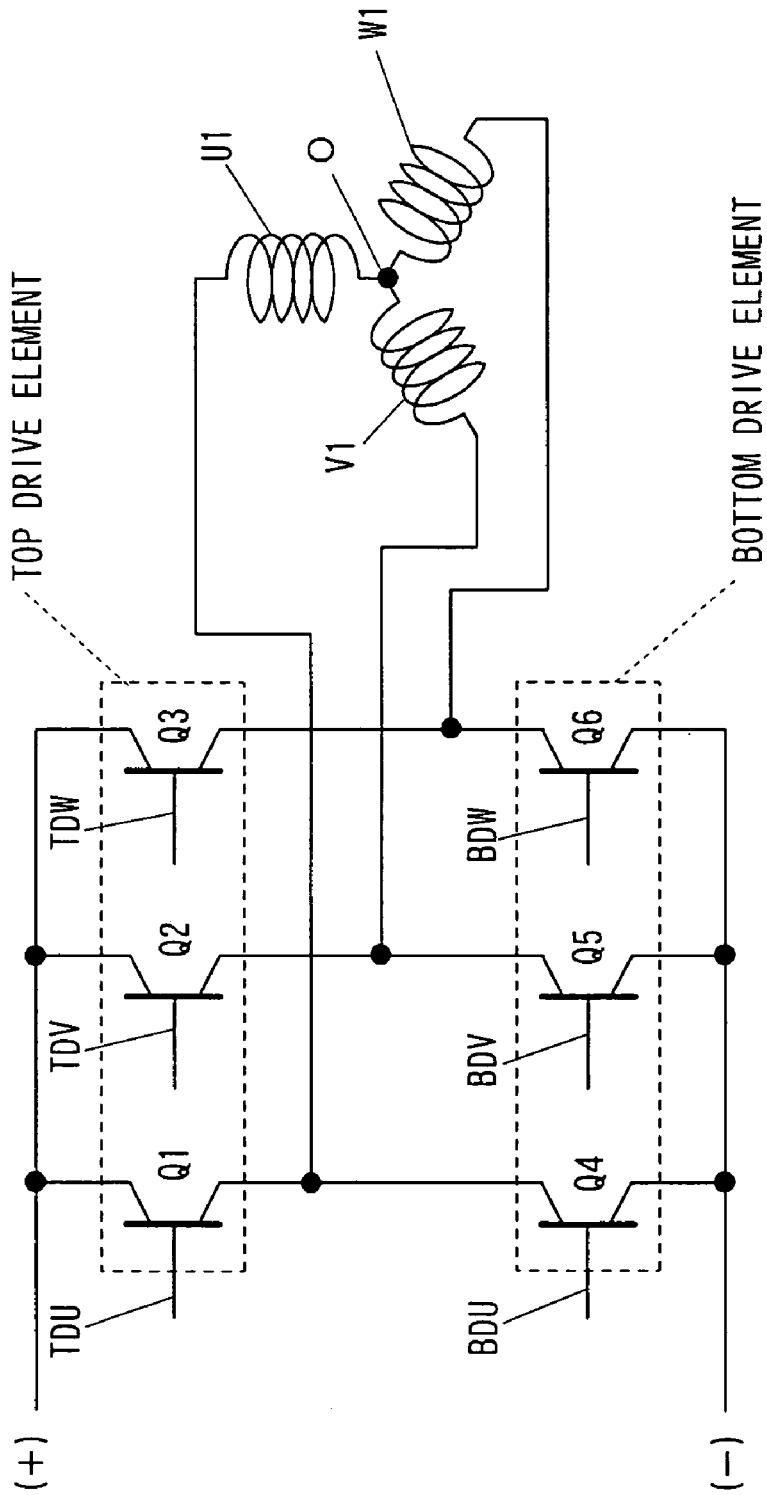
FIG. 3 is a circuit diagram of the embodiment.

FIG. 3 shows essential portions of the motor section A and an electric circuit of the drive circuit 9 when the motor is three-phase brushless motor. Transistors Q1, Q2, Q3, Q4, Q5 and Q6 shown in FIG. 3 are the power elements 10. A switching circuit of phases U, V and W of the stator 1 is constituted as follows.

One ends of stator windings U1, V1 and W1 of U, V and W are connected to each other at a midpoint O. A series circuit of the transistors Q1 and Q4, a series circuit of the transistors Q2 and Q5 and a series circuit of the transistors Q3 and Q6 are connected between a power supply line (+) and a power supply line (−). The other end of the stator winding U1 of the U-phase is connected to a junction point between the transistors Q1 and Q4. The other end of the stator winding V1 of the V-phase is connected to a junction point between the transistors Q2 and Q5. The other end of the stator winding W1 of the W-phase is connected to a junction point between the transistors Q3 and Q6. The transistors Q1 to Q3 connected to the power supply line (+) are top drive elements TDE. The transistors Q4 to Q6 connected to the power supply line (−) are bottom drive elements BDE.

Figure 4:
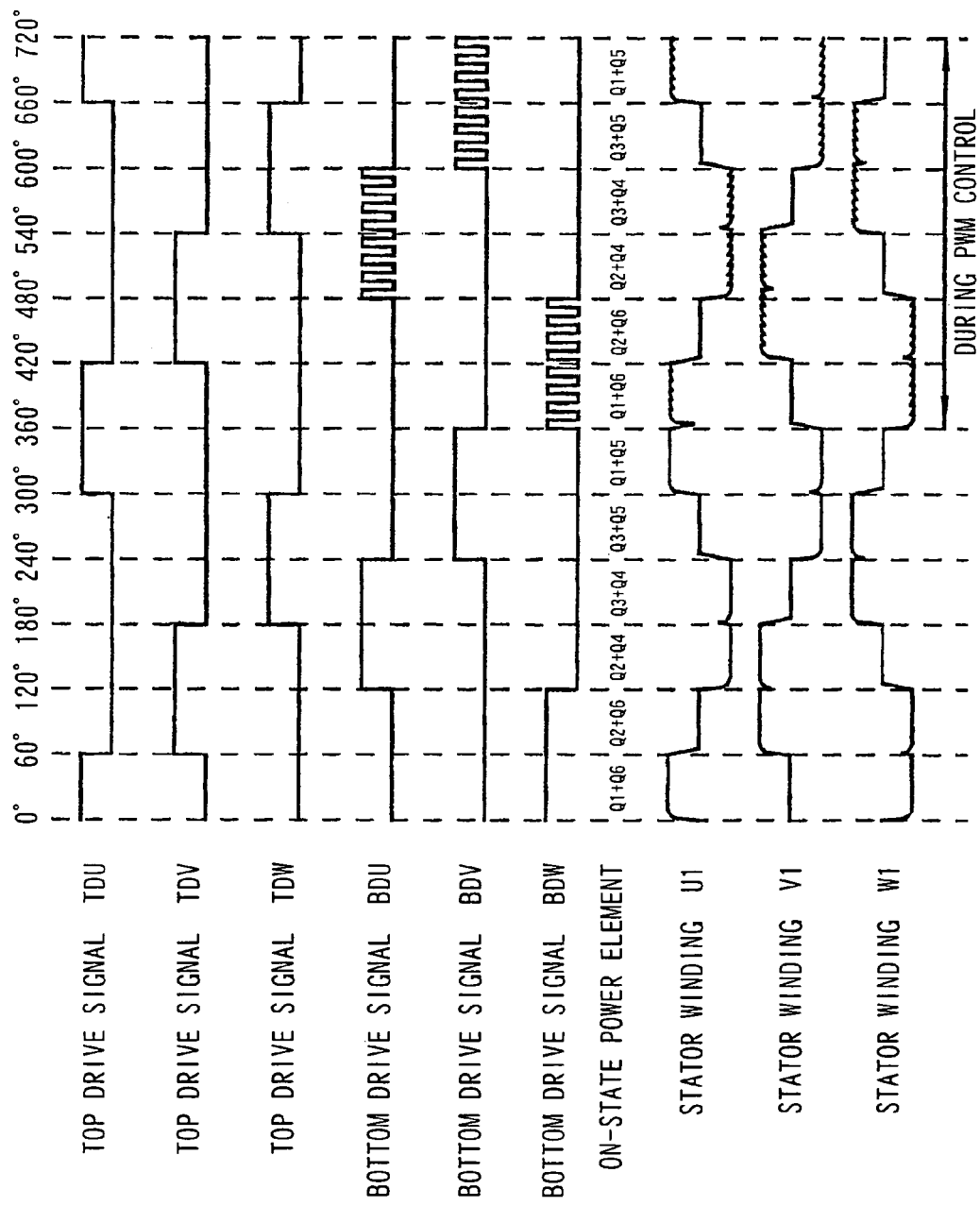
FIG. 4 is a waveform chart of essential portions of a drive circuit of the embodiment.

FIG. 4 shows waveforms of currents supplied to stator windings U1, V1 and W1 when top drive signals TDU, TDV and TDW to be applied to gates of the transistors Q1 to Q3, and bottom drive signals BDU, BDV and BDW to be applied to gates of transistors Q4 to Q6 are supplied.

More specifically, the output circuits of the transistors Q1 to Q6 are turned on when drive signals TDU, TDV, TDW, BDU, BDV and BDW supplied to the gates are at H level. In the range of 0° to 60°, the top drive signal TDU and the bottom drive signal BDW are at H level, so that the transistors Q1 and Q6 are turned on, electricity is supplied from the power supply line (+) to the power supply line (−) through the transistor Q1, the stator winding U1, the stator winding W1 and the transistor Q6 in this order. In this manner, the transistors Q1 to Q6 are turned on and off in accordance with the drive signals to form a rotating field, and the rotor 2 rotates.

Figure 5:
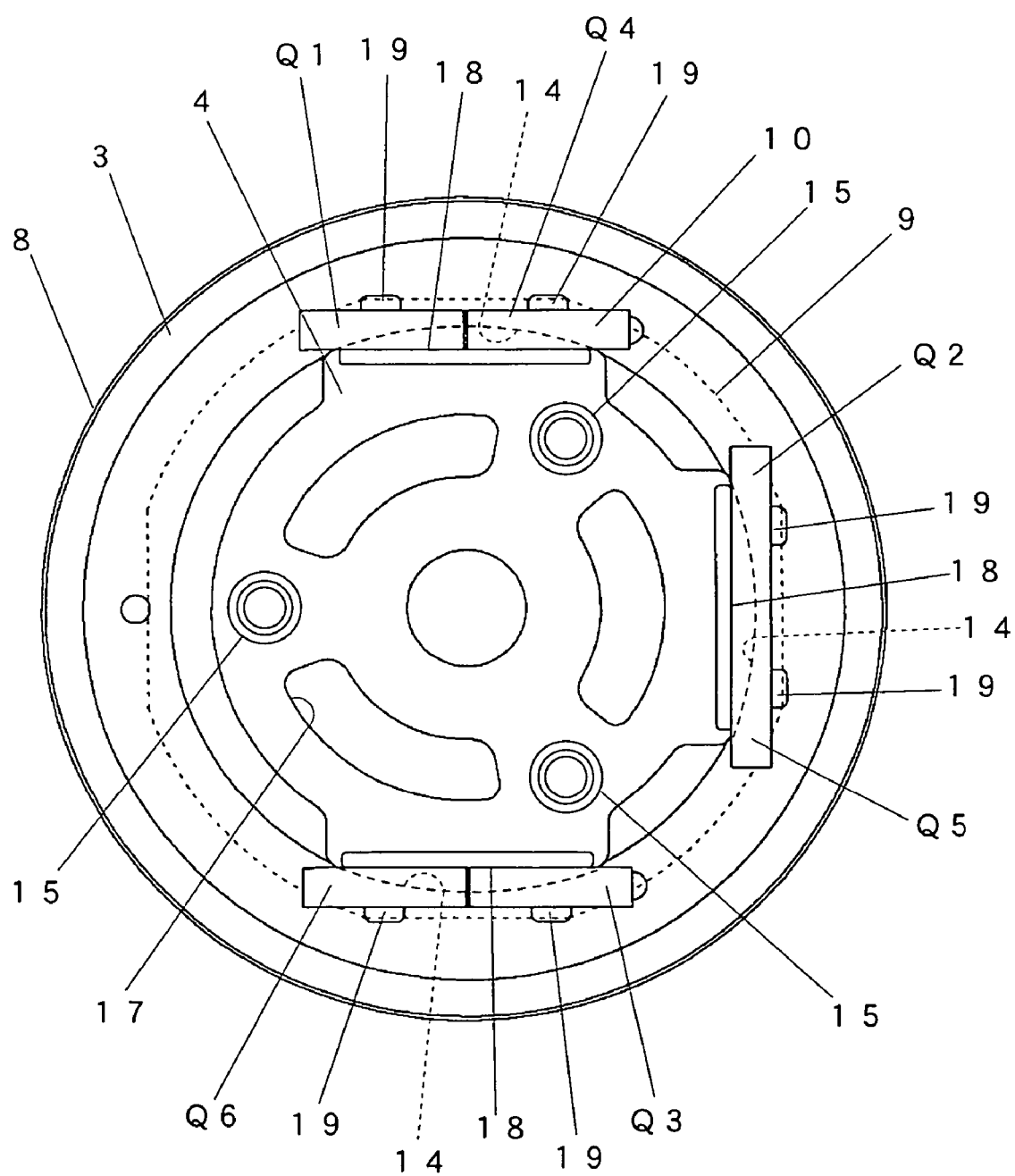
FIG. 5 shows pairs of power elements spaced from one another through 90° according to the invention.

As shown in FIG. 5, the transistors Q1 to Q6 are thermally connected to a mount portion 18 formed on an outer peripheral surface of the bracket 4 from outside of the bracket 4 by means of screws 19.

With this structure, heat generated by the transistors Q1 to Q6 is radiated to the bracket 4, and is forcibly cooled by air flow discharged from the air opening 14. Therefore, it is possible to efficiently cool the stator 1 and the rotor 2 as well as the transistors Q1 to Q6 without using the large-scale heat radiator 11 which is independent from the motor casing B unlike the conventional technique. Thus, it is possible to realize an electrically powered blower having a structure contributing to miniaturization of electric equipment.

Figure 6:
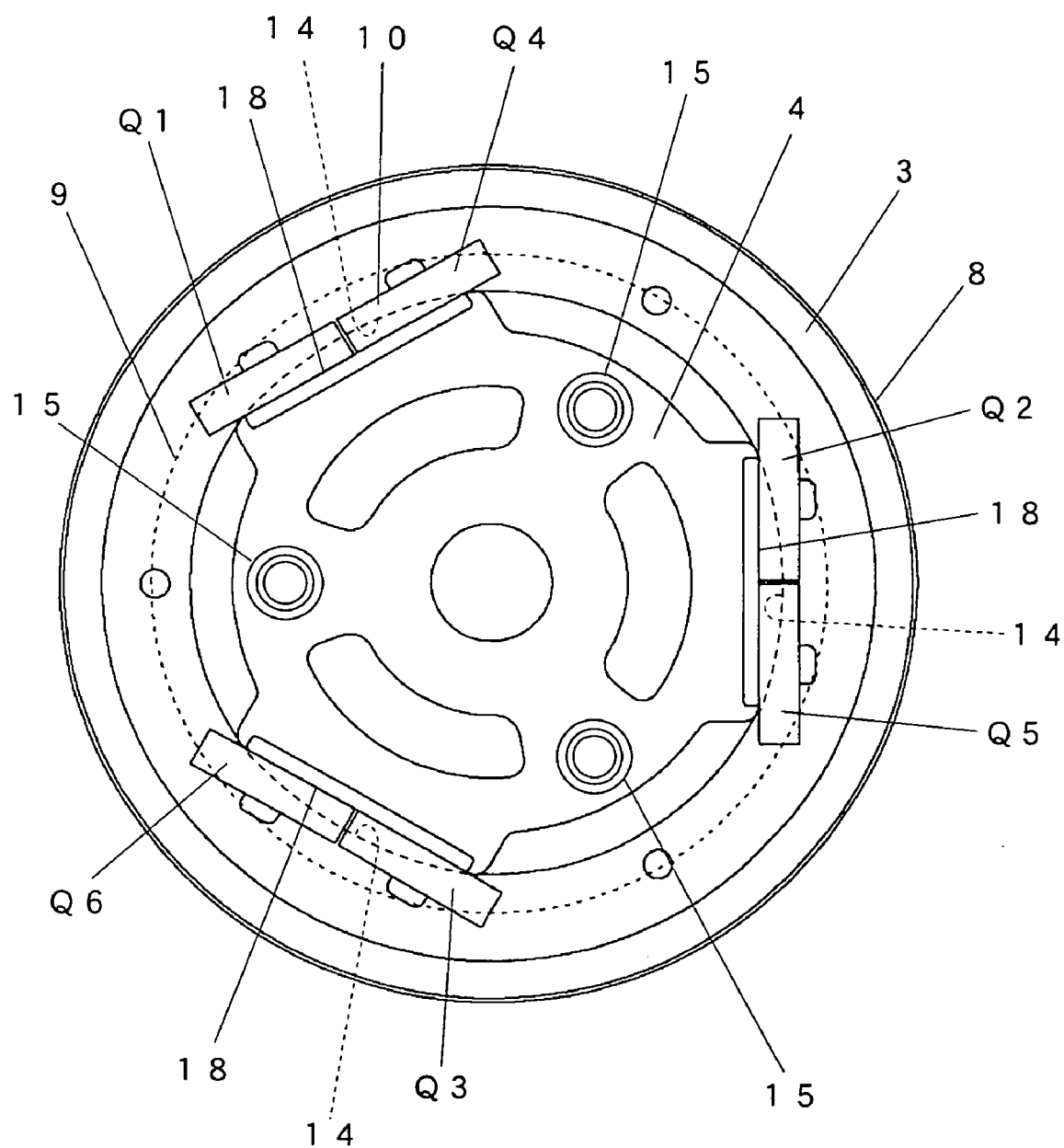
FIG. 6 shows pairs of power elements spaced from one another through 120° according to the invention.
Figure 7:
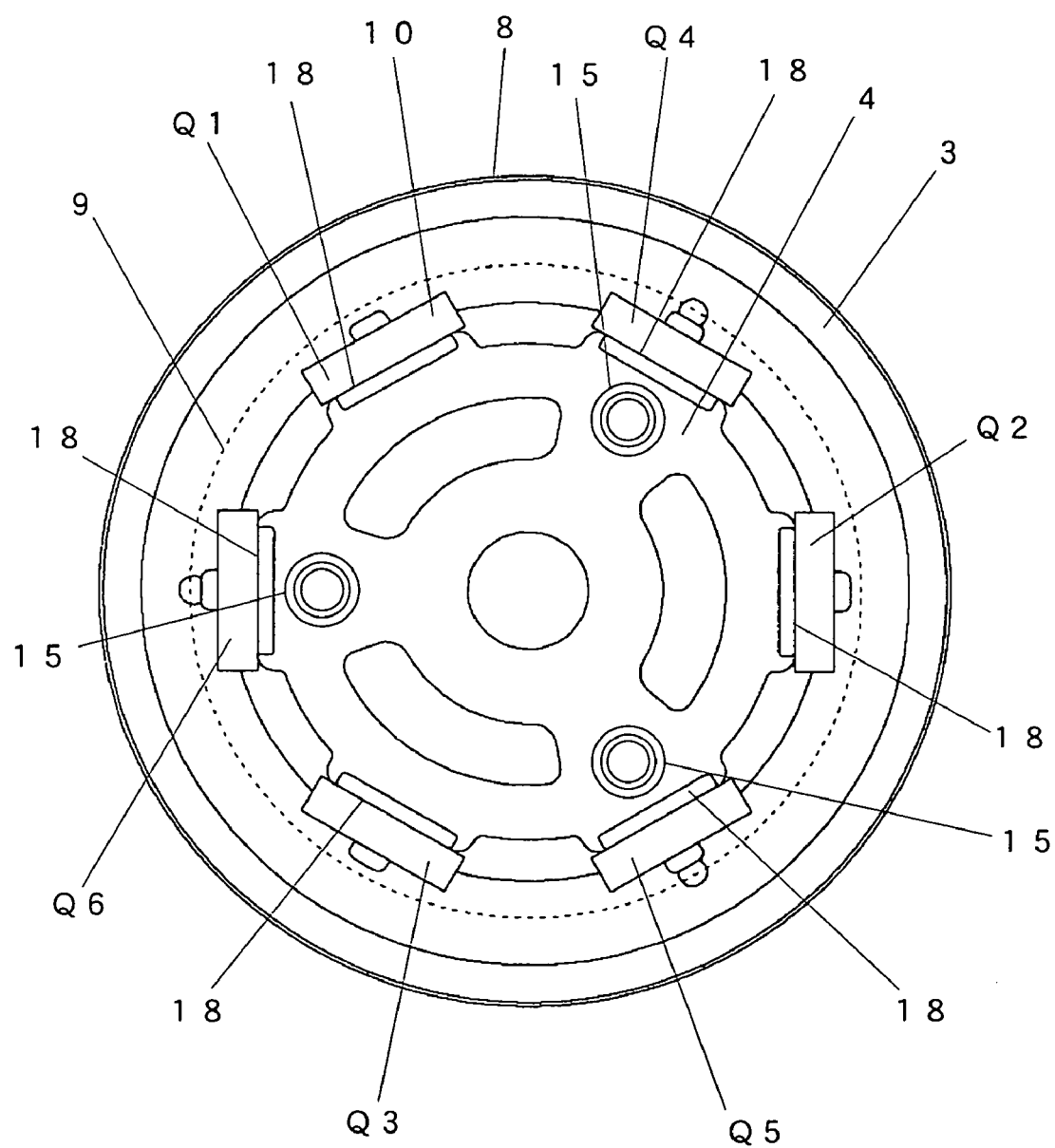
FIG. 7 shows pairs of power elements spaced from one another through 60° according to the invention.

In FIG. 5, the top drive transistors and the bottom drive transistors pair up with each other, and the transistors Q1 and Q4, the transistors Q2 and Q5, and the transistors Q3 and Q6 are spaced from one another through 90°. Alternatively, the mount portion 18 may be formed on the bracket 4 such that the transistors Q1 to Q6 are spaced from one another through 120° as shown in FIG. 6, or the mount portion 18 may be formed on the bracket 4 such that the transistors Q1 to Q6 are spaced from one another through 60° as shown in FIG. 7.

In this case, when one of the pair of top drive and bottom drive power elements 10 of each phase is switched, the temperature rise can be equalized as compared with a case in which the power elements 10 to be switched are disposed at one location. Therefore, even if the bracket 4 which functions as a heat radiation area has the same size, sufficient heat radiation effect can be obtained, and the heat distributions of the brackets 3 and 4 can be equalized.

Embodiment 2

Figure 8:
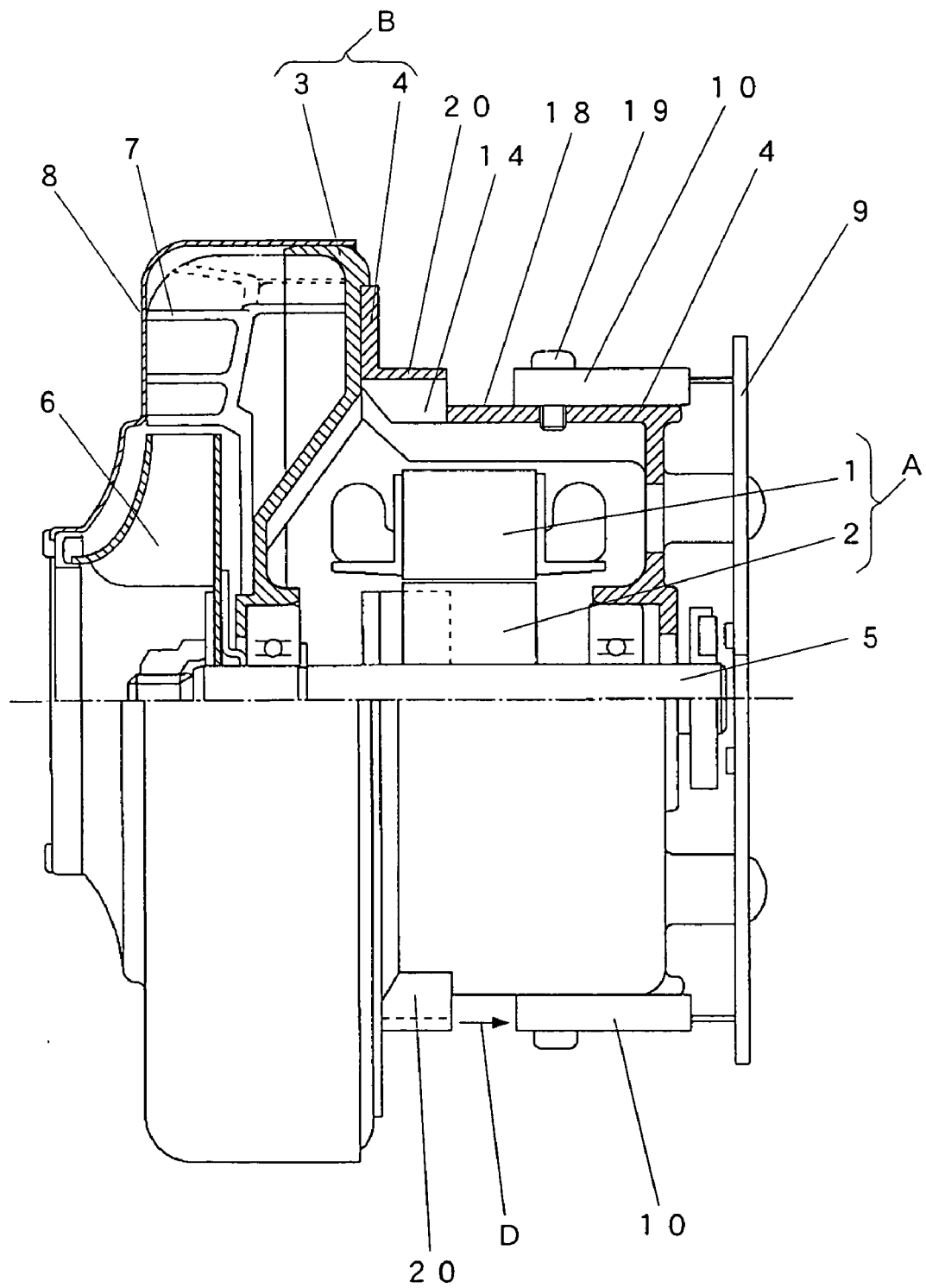
FIG. 8 is a semi-sectional view of an electrically powered blower (Embodiment 2) of the present invention.
Figure 9:
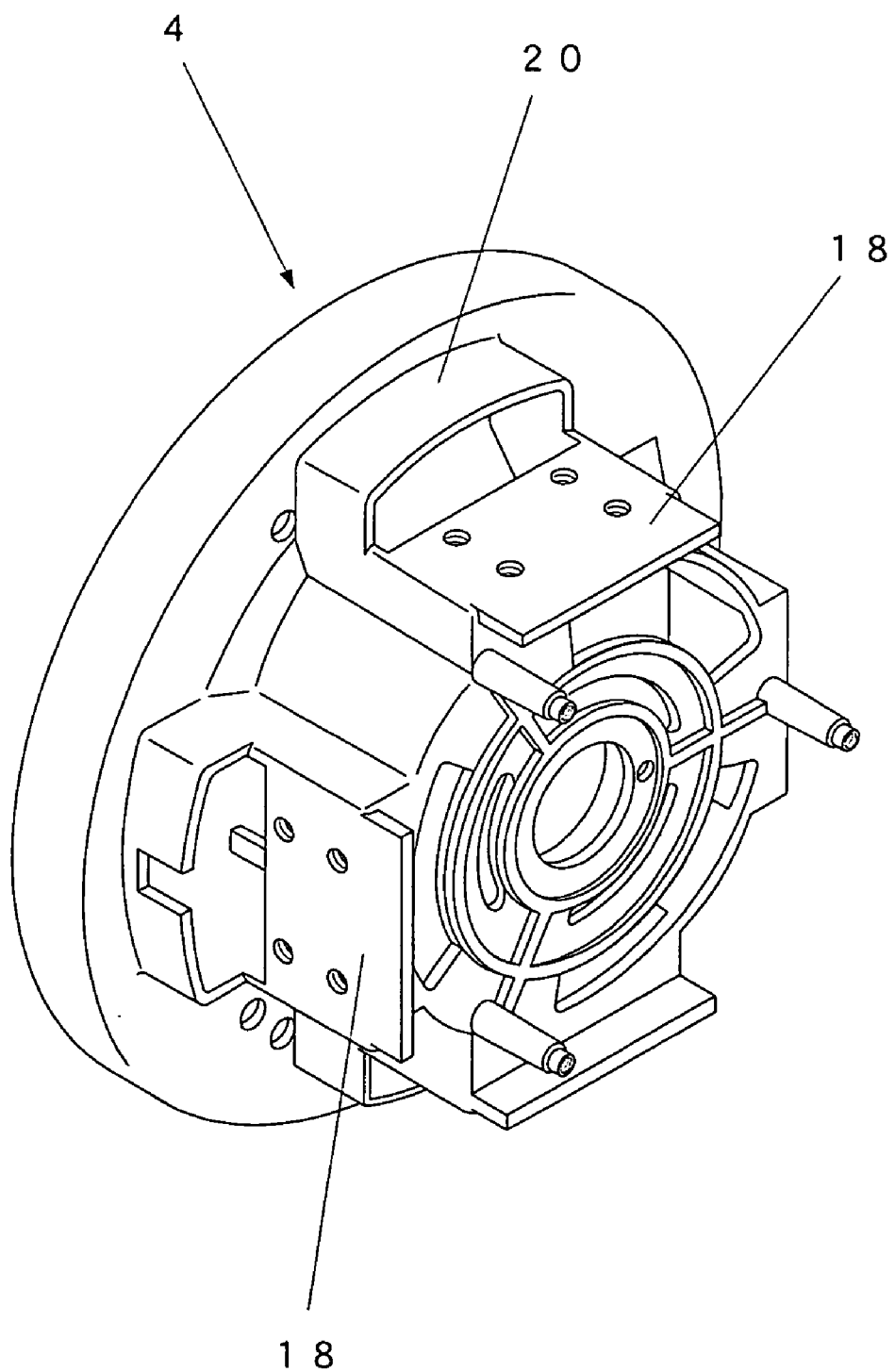
FIG. 9 is a perspective view of a bracket 4 of the embodiment.

FIGS. 8 and 9 show Embodiment 2 of the present invention.

Embodiment 2 is different from Embodiment 1 only in that a wind direction guide 20 is added to a portion of the bracket 4, and other structure is the same as that of Embodiment 1.

The wind direction guide 20 extends around the air opening 14 of the bracket 4 toward the power element 10. An air flow D which is discharged from the air opening 14 and guided by the wind direction guide 20 comes into contact with the power elements 10, thereby enhancing the cooling efficiency.

Embodiment 3

Figure 10:
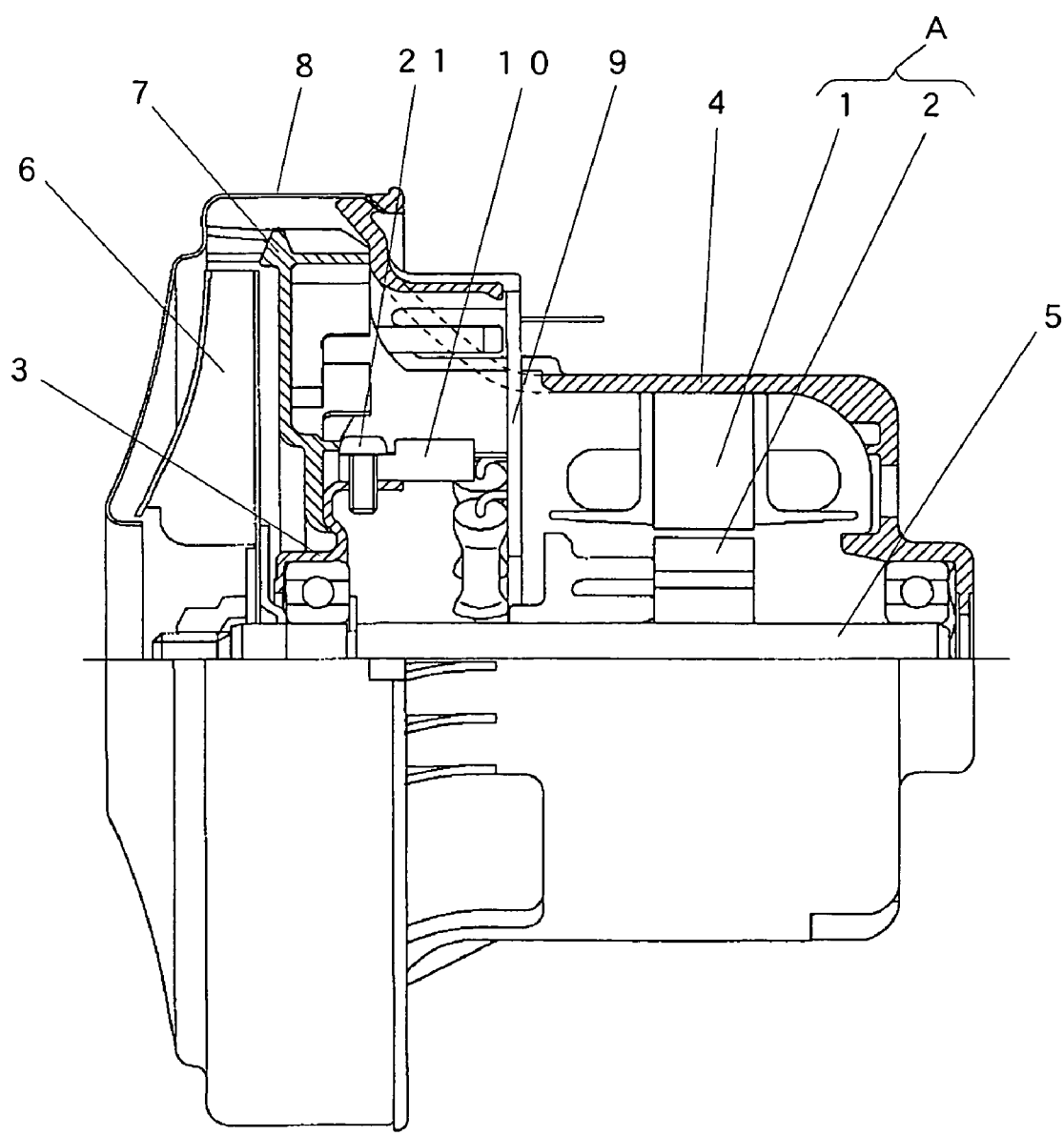
FIG. 10 is a semi-sectional view of an electrically powered blower (Embodiment 3) of the present invention.
Figure 11:
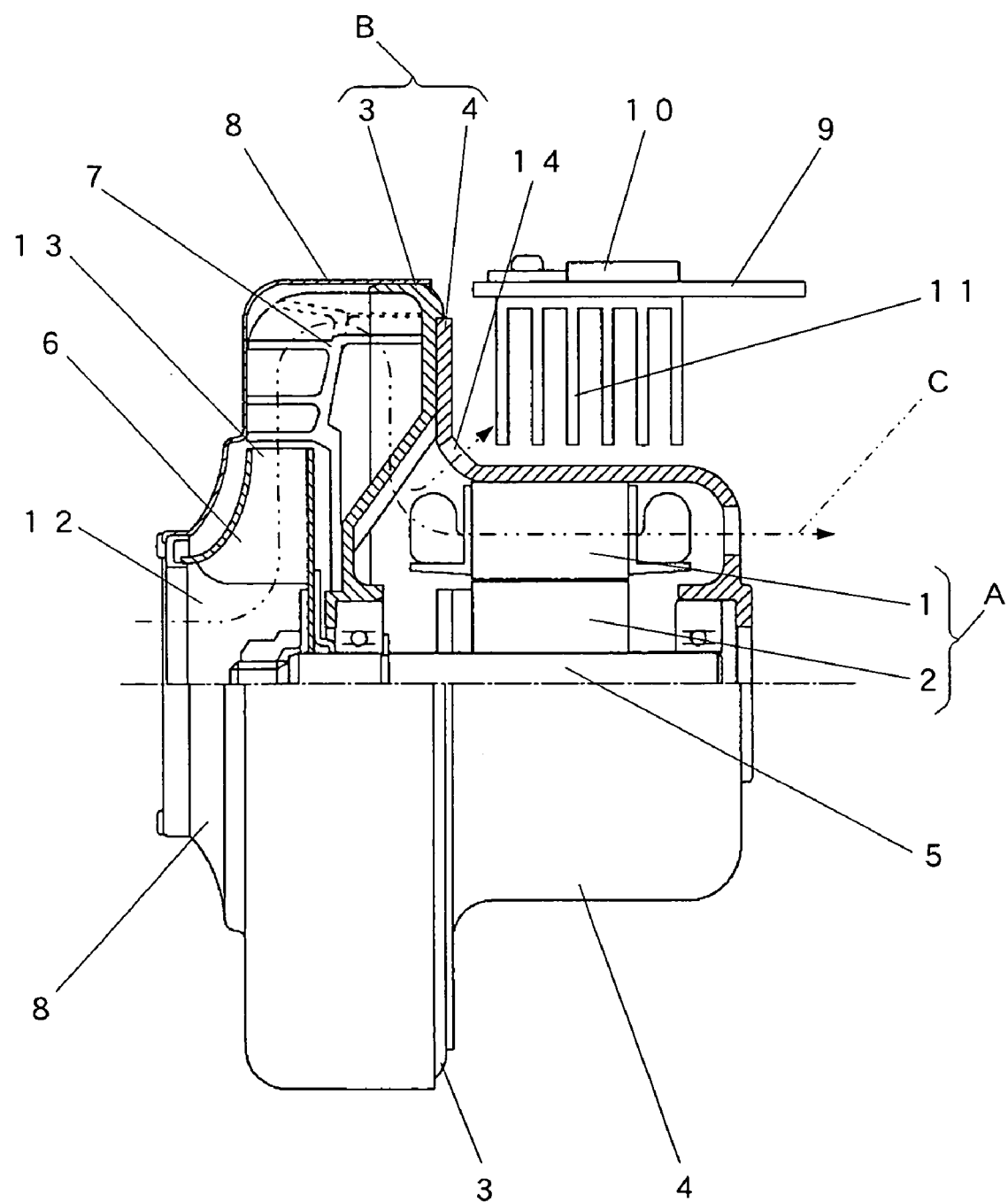
FIG. 11 is a semi-sectional view of a conventional electrically powered blower.

FIG. 10 shows Embodiment 3 of the present invention.

In Embodiments 1 and 2, the drive circuit 9 is mounted on the outer side of the motor casing B. Embodiment 3 is different from Embodiments 1 and 2 in that the drive circuit 9 is mounted on an inner side of the motor casing B.

More specifically, the brackets 3 and 4 form the motor casing B which covers the motor section A comprising the stator 1 and the rotor 2. The outer periphery of the fan case 8 is connected to the bracket 4, the bracket 3 is disposed in an space surrounded by the bracket 4 and the fan case 8. The drive circuit 9 is incorporated inside the motor casing B. The power element 10 is mounted on the bracket 3 by means of a screw 21 in a space surrounded by the bracket 4 and the fan case 8.

The plurality of power elements 10 are mounted on the bracket 3 such that the power elements 10 are spaced from one another through 90°, 120° or 60° as shown in FIG. 5, 6 or 7 which shows Embodiment 1.

With this structure, heat generated by the power elements 10 (transistors Q1 to Q6) is radiated to the bracket 3, and is forcibly cooled by air flow discharged toward the motor casing B. Therefore, it is possible to efficiently cool the stator 1 and the rotor 2 as well as the power elements 10 without using the large-scale heat radiator 11 which is independent from the motor casing B unlike the conventional technique. Thus, it is possible to realize an electrically powered blower having a structure contributing to miniaturization of electric equipment.

Although the motor section A for the electrically powered blower is the brushless motor in each embodiment, the same structure and the same effect can be obtained even if the motor is a switched reluctance motor.

According to the electrically powered blower of the present invention, the drive circuit is cooled by wind generated when the motor section is operated. Since the motor casing functions as a cooling fin for the power element, cooling efficiency can be obtained and an electrically powered blower having excellent radiation performance can be obtained.

If the electrically powered blower having such effect is mounted in the electric equipment such as a vacuum cleaner, the reliability of the electric equipment can be enhanced.

The invention claimed is:

1. An electrically powered blower, comprising:
   a stator and a rotor which can rotate relative to the stator, each being provided inside a motor casing,
   a fan mounted on one end of an output shaft rotatably supporting the rotor and extending outward of the motor casing,
   a fan case fixed to an outer periphery of the motor casing so as to cover the fan, the fan case including an opening corresponding to a suction port of the fan,
   an air passage which discharges air through a discharge port of the fan through an inner side of the motor casing,
   power elements of a drive circuit which control electric supply to the motor section comprising the stator and the rotor, the power elements being mounted on an outer peripheral surface of the motor casing and thermally connected, the motor casing having an air opening which directs a portion of air flow to come into contact with the power elements, and
   a wind direction guide formed in the motor casing, the guide extending from the air opening toward the power elements.

2. The electrically powered blower according to claim 1, wherein the motor casing, which covers the motor section comprising the stator and the rotor, comprises first and second brackets, and an outer periphery of the fan case is connected to the second bracket, the first bracket being disposed in a space surrounded by the second bracket and the fan case, the drive circuit being incorporated inside the motor casing formed by the first and second brackets, the power element being mounted on the first bracket in a space surrounded by the second bracket and the fan case.

3. The electrically powered blower according to claim 1, wherein the motor section is operated by supplying currents of a plurality of phases, and a pair of top drive power element and bottom drive power element is disposed for each phase.

4. The electrically powered blower according to claim 3, wherein the motor section is operated by supplying currents of three phases, and the pair of top drive power element and bottom drive power element is disposed for each phase such as to be spaced from another through 120°.

5. The electrically powered blower according to claim 1, wherein the motor section is operated by supplying currents of three phases, and the top drive power element and the bottom drive power element are disposed as a pair of power elements for each phase such as to be spaced from another through 60°.

6. An electric equipment using the electrically powered blower according to claim 1 as an electrically powered blower for suction.

* * * * *

UNITED STATES PATENT AND TRADEMARK OFFICE
CERTIFICATE OF CORRECTION

PATENT NO. : 7,281,908 B2
APPLICATION NO. : 10/499727
DATED : October 16, 2007
INVENTOR(S) : Katsutoshi Fujita et al.

It is certified that error appears in the above-identified patent and that said Letters Patent is hereby corrected as shown below:

Title Page;

Correct the assignee name to read as follows:

(73) Assignee: Matsushita Electric Industrial Co., Ltd., Osaka (JP)

Signed and Sealed this

Twenty Second Day of April, 2008

JON W. DUDAS
*Director of the United States Patent and Trademark Office*